US006585775B1

(12) United States Patent
Cosentino et al.

(10) Patent No.: US 6,585,775 B1
(45) Date of Patent: Jul. 1, 2003

(54) FINANCIAL DOCUMENT PROCESSING SYSTEM AND METHOD OF OPERATING A FINANCIAL DOCUMENT PROCESSING SYSTEM DURING EXCEPTION RECOVERY

(75) Inventors: Joseph Cosentino, Hamilton (CA); Richard A. Anderson, Waterloo (CA)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/292,892

(22) Filed: Apr. 16, 1999

(51) Int. Cl.[7] .............................. G06F 17/00; G06K 9/00
(52) U.S. Cl. ....................................... 715/500; 382/137
(58) Field of Search ........................... 714/752; 700/90, 700/17; 715/500

(56) References Cited

U.S. PATENT DOCUMENTS

| 4,315,246 | A |   | 2/1982  | Milford          |         |
|-----------|---|---|---------|------------------|---------|
| 5,097,517 | A | * | 3/1992  | Holt             | 382/137 |
| 5,321,816 | A | * | 6/1994  | Rogan et al.     | 705/42  |
| 5,825,506 | A |   | 10/1998 | Bednar et al.    |         |
| 6,055,650 | A | * | 4/2000  | Christie         | 710/15  |
| 6,438,433 | B1| * | 8/2002  | Gawne            | 382/306 |

OTHER PUBLICATIONS

"Codeline Data Matching of Rejects on a Reader Sorter", IBM Technical Disclosure Bulletin, IBM Corp. New York, US, vol. 37, No. 8, Aug. 1, 1994, p. 503, XP000456505, ISSN: 0018–8689.
"Host Codeline Data Match", IBM Technical Disclosure Bulletin, IBM Corp. New York, US, vol. 37, No. 8, Aug. 1, 1994, pp. 657–658, XP000456560, ISSN: 0018–8689.

* cited by examiner

Primary Examiner—Albert Decady
Assistant Examiner—C Britt
(74) Attorney, Agent, or Firm—Michael Chan

(57) ABSTRACT

A financial document processing system for processing financial documents is operated to assist an operator during exception recovery. During exception recovery, an original codeline, an encoded data string, and a recovery codeline associated with a financial document are obtained. Any blank spaces from the original codeline, the encoded data string, and the recovery codeline are stripped to provide a stripped original codeline, a stripped encoded data string, and a stripped recovery codeline, respectively. A number of characters of the stripped recovery codeline and a number of characters of the stripped original codeline are compared to determine if there is a match between the original codeline and the recovery codeline. When there is a mismatch of characters between the stripped recovery codeline and the stripped original codeline, a number of characters of the stripped recovery codeline and a number of characters of the stripped encoded data string are compared to determine if there is a match between the original codeline/encoded data string and the recovery codeline.

6 Claims, 5 Drawing Sheets

ORIGINAL CODELINE

ORIGINAL CODELINE WITH STRIPPED SPACES

ENCODED DATA STRING

ENCODED DATA STRING WITH STRIPPED SPACES

RECOVERY CODELINE

RECOVERY CODELINE WITH STRIPPED SPACES

FINANCIAL DOCUMENT PROCESSING SYSTEM AND METHOD OF OPERATING A FINANCIAL DOCUMENT PROCESSING SYSTEM DURING EXCEPTION RECOVERY

BACKGROUND OF THE INVENTION

The present invention relates to financial document processing systems, and is particularly directed to a method of operating a financial document processing system, such as an image-based check processing system, during exception recovery.

A typical image-based check processing system includes a check processing transport which has a document transport path and a number of different hardware devices lying along the document transport path for performing specific document processing operations on documents moving downstream along the document transport path. The check processing system also includes a transport processor which executes a transport application program which is stored in memory to control operation of the devices lying along the document transport path and thereby to control operation of the check processing transport.

From time to time, an exception condition may occur while processing documents on the check processing transport. Exception conditions include document jams, hardware failures, application errors, media low or empty, a pocket full, for examples. Typically, when an exception condition occurs, any documents in the document transport path that have not been completely processed are manually located by an operator and removed from the document transport path. To avoid problems further downstream, the operator must ensure that all checks which have not been completely processed are removed from the document transport path. Once the problem that caused the exception is resolved, the operator must reprocess the documents in their original order.

In known transport application programs, codeline matching programs are typically used to assist operators in organizing the removed documents in their original order. In these codeline matching programs, a codeline is usually parsed into fields so that any encoded data string which has been added to an original codeline can be more easily handled. Also, any variability in positioning of data in a codeline can be more easily handled when the codeline is parsed into fields. A disadvantage in using a codeline matching program which parses a codeline into fields is that each codeline matching program is dependent upon a specific transport application program and cannot be used in other transport application programs unless programming changes are incorporated into that particular codeline matching program. Such programming changes are usually time-consuming and relatively costly to incorporate. It would be desirable to provide a codeline matching program which is independent of any particular transport application program and which can be used in a number of different transport application programs without requiring any programming changes to the codeline matching program.

SUMMARY OF THE INVENTION

In accordance with one aspect of the present invention, a method of operating a financial document processing system during exception recovery comprises the steps of (a) obtaining an original codeline associated with a financial document, (b) obtaining a recovery codeline associated the financial document, (c) stripping any blank spaces from the original codeline to provide a stripped original codeline, (d) stripping any blank spaces from the recovery codeline to provide a stripped recovery codeline, and (e) comparing a number of characters of the stripped recovery codeline and a number of characters of the stripped original codeline to determine if there is a match between the original codeline and the recovery codeline. Preferably, the method further comprises the steps of (f) obtaining an encoded data string associated with the financial document, (g) stripping any blank spaces from the encoded data string to provide a stripped encoded data string, and (h) comparing a number of characters of the stripped recovery codeline with a number of characters of the stripped encoded data string when there is a mismatch of characters between the stripped recovery codeline and the stripped original codeline in step (e) to determine if there is a match between the original codeline/encoded data string and the recovery codeline.

In accordance with another aspect of the present invention, a financial document processing system is provided for processing a financial document. The financial document processing system comprises means for (i) obtaining an original codeline associated with the financial document, and (ii) obtaining a recovery codeline associated the financial document. Means is provided for (i) stripping any blank spaces from the original codeline to provide a stripped original codeline, and (ii) stripping any blank spaces from the recovery codeline to provide a stripped recovery codeline. Means is provided for comparing a number of characters of the stripped recovery codeline and a number of characters of the stripped original codeline to determine if there is a match between the original codeline and the recovery codeline. Preferably, the financial document processing system further comprises (i) means for obtaining an encoded data string associated with the financial document, (ii) means for stripping any blank spaces from the encoded data string to provide a stripped encoded data string, and (iii) means for comparing a number of characters of the stripped recovery codeline with a number of characters of the stripped encoded data string when there is a mismatch of characters between the stripped recovery codeline and the stripped original codeline to determine if there is a match between the original codeline/encoded data string and the recovery codeline.

In accordance with yet another aspect of the present invention, a program storage medium readable by a computer having a memory is provided. The medium tangibly embodies one or more programs of instructions executable by the computer to perform method steps for operating a financial document processing system during exception recovery. The method comprises the steps of (a) obtaining an original codeline associated with a financial document, (b) obtaining a recovery codeline associated the financial document, (c) stripping any blank spaces from the original codeline to provide a stripped original codeline, (d) stripping any blank spaces from the recovery codeline to provide a stripped recovery codeline, and (e) comparing a number of characters of the stripped recovery codeline and a number of characters of the stripped original codeline to determine if there is a match between the original codeline and the recovery codeline. The method may also comprise the steps of (f) obtaining an encoded data string associated with the financial document, (g) stripping any blank spaces from the encoded data string to provide a stripped encoded data string, and (h) comparing a number of characters of the stripped recovery codeline with a number of characters of the stripped encoded data string when there is a mismatch of characters between the stripped recovery codeline and the stripped original codeline in step (e) to determine if there is a match between the original codeline/encoded data string and the recovery codeline.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DETAILS OF THE INVENTION

Figure 1:
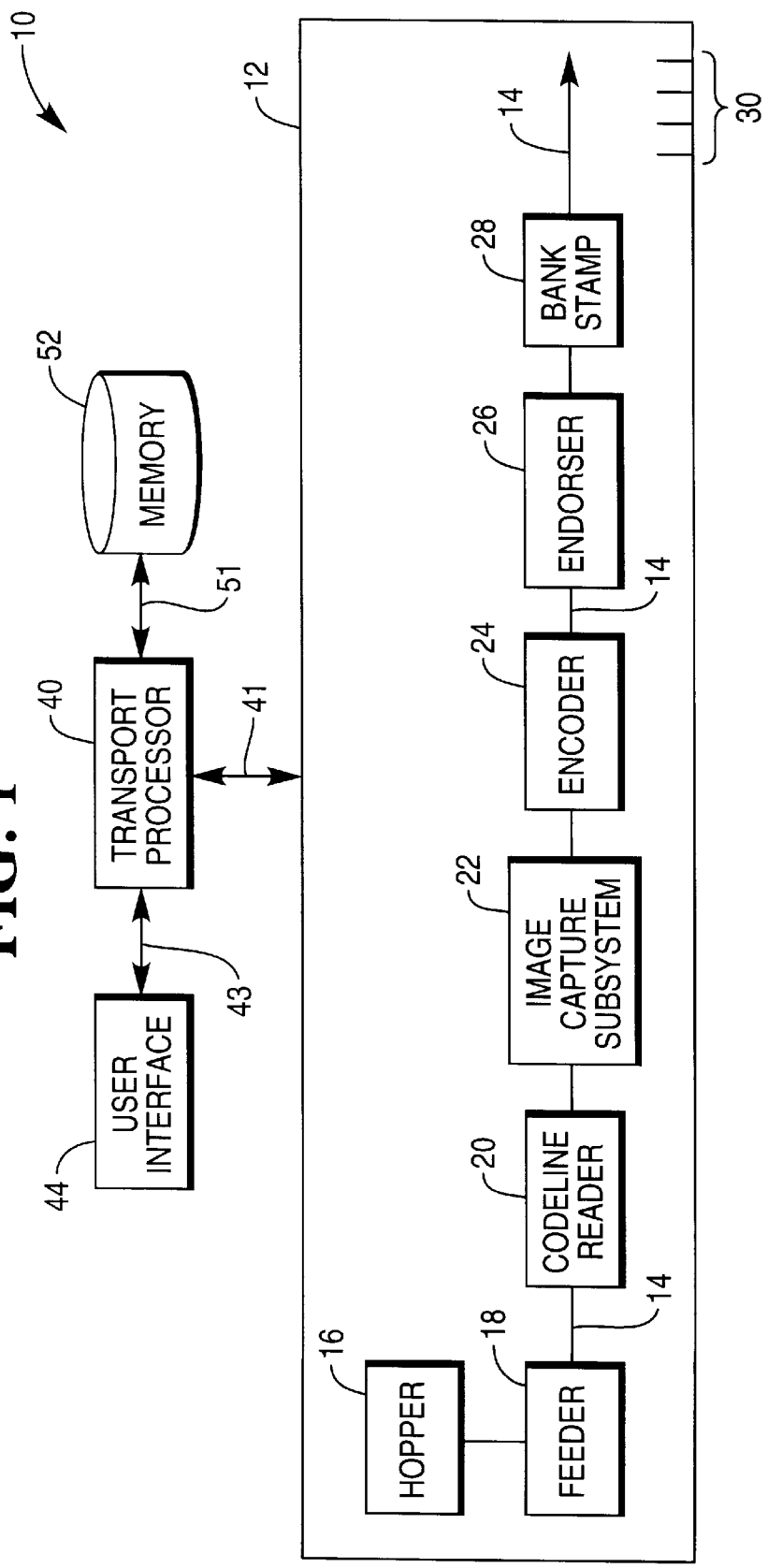
FIG. 1 is a schematic block representation of an image-based check processing system embodying the present invention.

The present invention is directed to operating a financial document processing system during exception recovery. The specific construction and use of the financial document processing system may vary. By way of example, a financial document processing system in the form of an image-based check processing system 10 is illustrated in FIG. 1. The check processing system 10 may be, for example, a sorting machine or a proof machine wherein financial documents such as checks are processed in a data processing operation.

As shown in FIG. 1, the check processing system 10 includes a check processing transport 12 having a document track which defines a document transport path 14 along which financial documents, such as checks, can be transported from an upstream end to a downstream end. The transport 12 includes a number of different hardware devices lying along the document transport path 14 for performing specific document processing operations on documents moving along the document transport path 14. The transport 12 includes a hopper 16 into which a stack of financial documents including checks are placed. A document feeder 18 adjacent the hopper 16 selectively feeds or drives each document from the stack of documents in the hopper to transport the document from the upstream end to the downstream end along the document transport path 14 to sorting bins 30 located at the end of the document transport path.

The check processing system 10 further includes a codeline reader 20 such as a MICR reader located along the document transport path 14. The MICR reader 20 reads a MICR codeline from each check being processed in a known manner. Alternatively, the codeline reader may be an OCR reader instead of a MICR reader depending upon on the particular application.

The check processing system 10 further includes an image capture subsystem 22 located along the document transport path 14. The image capture subsystem 22 captures an image of each document for a number of different purposes well known in the art. More specifically, the image capture subsystem 22 includes an imaging camera (not shown) which is controlled to capture images of documents moving along the document transport path 14.

An encoder 24 encodes missing fields on each check. An endorser 26 applies an endorsement in a known manner to each check. A bank stamp 28 stamps each check to identify the bank institution processing the check. The structure and operation of MICR readers, OCR readers, imaging cameras, encoders, endorsers, and bank stamps are well known and, therefore, will not be described.

Figure 2:
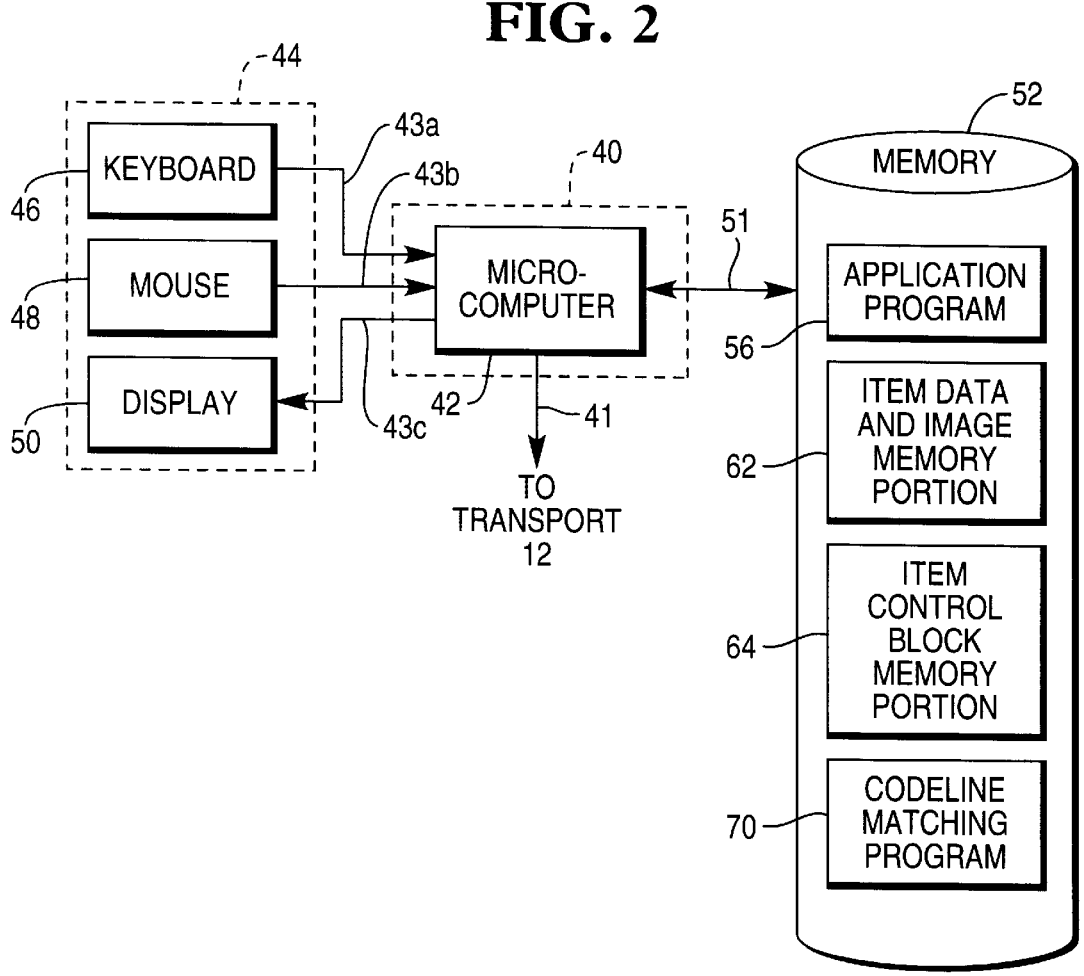
FIG. 2 is a schematic block representation of a portion of FIG. 1.

Referring to FIGS. 1 and 2, the check processing system 10 further includes a transport processor 40 and a user interface 44 which communicates via signals on line 43 (FIG. 1) with a microcomputer 42 of the transport processor 40. The user interface 44 includes a keyboard 46, a mouse 48, and a display 50, all of which communicate via signals on lines 43a, 43b, 43c (FIG. 2) with the microcomputer 42. Suitable microcomputers and memories are readily available in the marketplace. Their structure and operation are well known and, therefore, will not be described. The microcomputer 42 controls operation of the transport 12 via signals on line 41.

The check processing system 10 also includes a memory 52 which communicates via signals on line 51 with the microcomputer 42. It is contemplated that the memory 52 could be a single memory unit or a plurality of different memory units. An executable transport application program 56 is stored in the memory 52. The transport application program 56 is associated with a particular type of document processing work. For example, one type of work is proof of deposit. Another type of work is remittance processing. Still another type of work may be sorting of items. When the transport application program 56 is executed, the hardware devices lying along the document transport path 14 are controlled to process items moving downstream along the document transport path 14 in accordance with the transport application program, as is known.

The memory 52 includes an item data and image memory portion 62 which stores sequence numbers, MICR codelines, image data, encoder status, endorsement status, and bank stamp status associated with transaction items which have been processed in accordance with the transport application program 56. The memory unit 52 further includes an item control block memory portion 64 which stores data relating to certain items during an exception recovery process to be described later. More specifically, the data stored in the item control block memory portion 64 represents the current state of output operations (i.e., all completed and incomplete output operations) for each item involved in the exception condition along the document transport path 14. The memory 52 also stores a codeline matching program 70 in accordance with the present invention to be described in more detail hereinbelow.

Figure 3A:
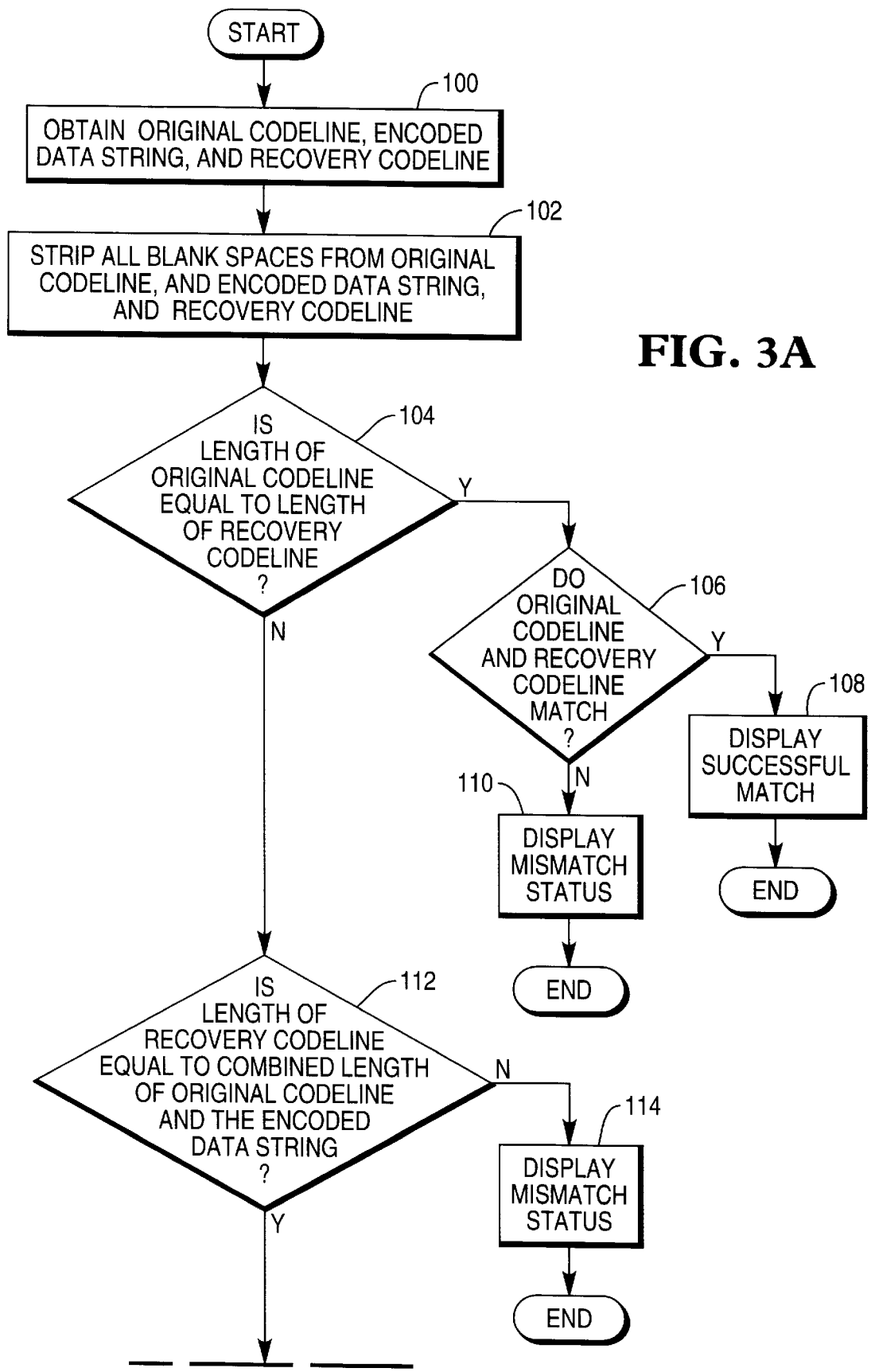
FIGS. 3A and 3B is a flowchart depicting processes carried out in accordance with the present invention.
Figure 3B:
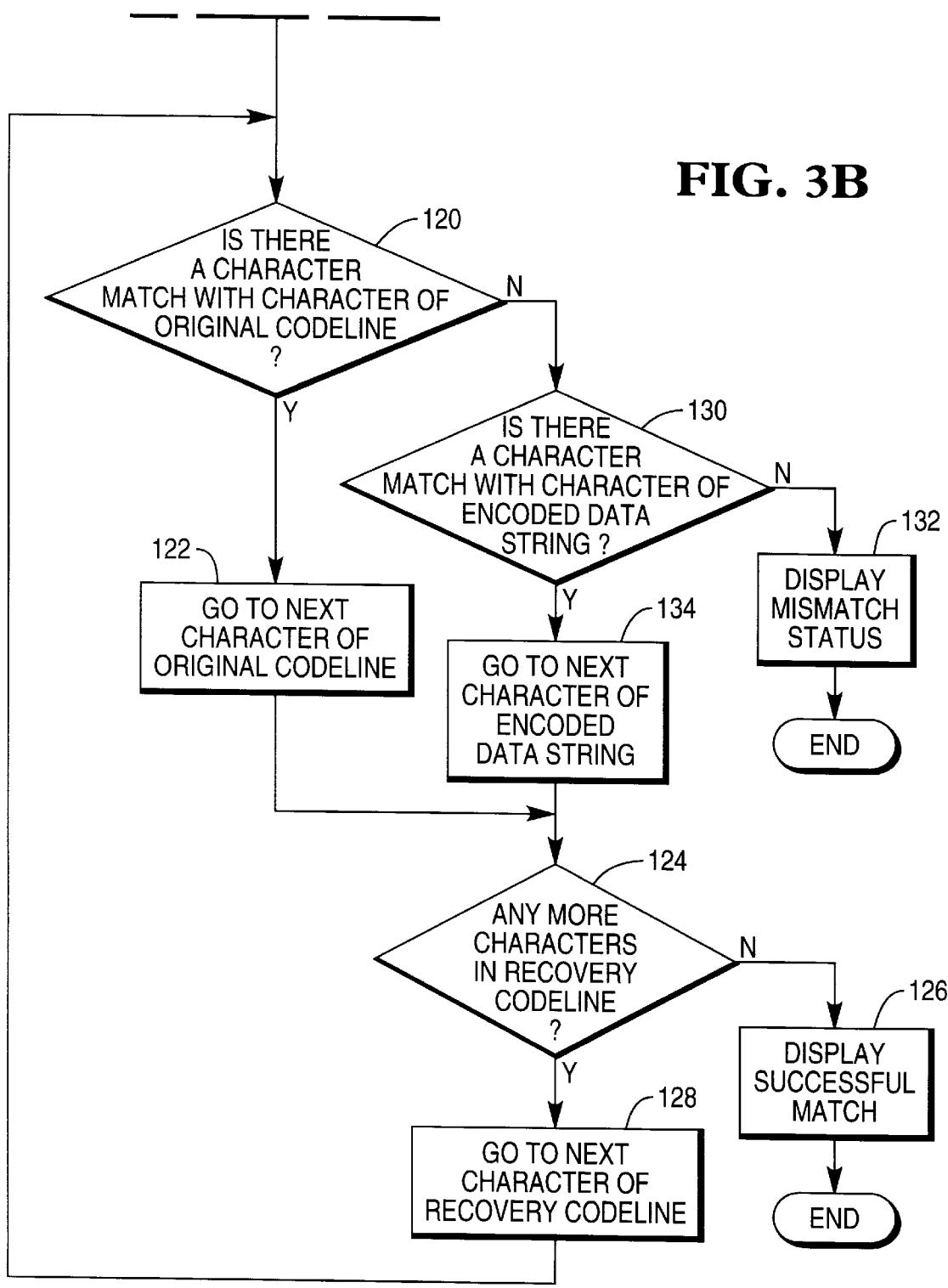

When an exception condition occurs along the document transport path 14, an exception recovery process is initiated. FIGS. 3A and 3B is a flowchart which depicts operation of the codeline matching program 70 which is initiated as each removed document is hand dropped to be reprocessed.

Figure 4A:
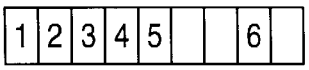
FIGS. 4A and 4B are representations of an original codeline from a check.
Figure 5A:
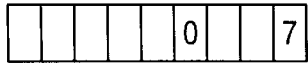
FIGS. 5A and 5B are representations of an encoded data string for encoding onto a check.
Figure 6A:
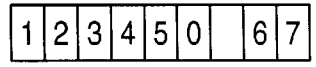
FIGS. 6A and 6B are representations of a recovery codeline which is the combination of the original codeline of FIGS. 4A and 4B and the encoded data string of FIGS. 5A and 5B.

In step 100, an original codeline such as shown in FIG. 4A, an encoded data string such as shown in FIG. 5A, and a recovery codeline such as shown in FIG. 6A are retrieved from the memory 52. The original codeline is a codeline from a check which has been processed by the MICR reader 20. The encoded data string is data (amount of a check for example) which either has been or needs to be encoded onto the corresponding check. The recovery codeline is a combination of the original codeline and any encoded data string which has been encoded onto the corresponding check.

More specifically, the original codeline and the encoded data string are retrieved from the item data and image memory portion 62 and the recovery codeline is retrieved from the item control block memory portion 64. The original codeline contains a number of characters and a number of blank spaces such as shown in FIG. 4A. The encoded data string contains a number of characters and a number of blank spaces such as shown in FIG. 5A. The recovery codeline contains a number of characters and a number of blank spaces such as shown in FIG. 6A.

Figure 4B:
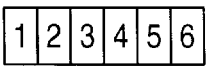
Figure 5B:
Figure 6B:
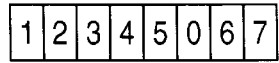

The program then proceeds to step 102 in which all blank spaces are stripped from the original codeline, the encoded data string, and the recovery codeline. The original codeline with blank spaces stripped away is shown in FIG. 4B. The encoded data string with blank spaces stripped away is shown in FIG. 5B. The recovery codeline with blank spaces stripped away is shown in FIG. 6B. A comparison is made in step 104 to determine if the length of the stripped original codeline of FIG. 4B and the length of the stripped recovery codeline of FIG. 5B are equal.

If the determination in step 104 is affirmative, then the program proceeds to step 106 to determine if the characters contained in the stripped original codeline matches the characters contained in the stripped recovery codeline. If the determination in step 106 is affirmative, then a determination is made that there is a successful match between the original codeline and the recovery codeline as shown in step 108. If the determination in step 106 is negative, then a determination is made that there is a mismatch between the original codeline and the recovery codeline as shown in step 110.

However, if the determination in step 104 is negative (as is the case shown in FIG. 4B and FIG. 6B), the program proceeds to step 112. In step 112, a determination is made as to whether the length of the stripped recovery codeline of FIG. 6B is equal to the combined length of the stripped original codeline of FIG. 4B and the stripped encoded data string of FIG. 5B. If the determination in step 112 is negative, then a determination is made that there is a mismatch between the original codeline/encoded data string and the recovery codeline. If the determination in step 112 is affirmative (as is the case shown in FIG. 4B, FIG. 5B, and FIG. 6B), then the program proceeds to step 120.

In step 120, a determination is made as to whether a left-most character of the stripped recovery codeline is compared with a left-most character of the stripped original codeline. If the determination in step 120 is affirmative, then the program proceeds to step 122 in which a pointer now points to the next left-most character of the stripped original codeline. A determination is then made in step 124 as to whether there are any more characters in the stripped recovery codeline to consider. If the determination in step 124 is negative, then a determination is made that there is a match between the original codeline/encoded data string and the recovery codeline as shown in step 126. Otherwise, if the determination in step 124 is affirmative, then the program proceeds to step 128 to consider the next left-most character contained in the stripped recovery codeline. The program then loops back to step 120.

However, if the determination in step 120 is negative, then the program proceeds to step 130 in which a determination is made as to whether the character of the stripped recovery codeline under consideration matches a left-most character of the stripped encoded data string. If the determination in step 130 is negative, then a determination is made that there is a mismatch between the original codeline/encoded data string and the recovery codeline under consideration.

Otherwise, if the determination in step 130 is affirmative, then the program proceeds to step 134 in which a pointer now points to the next left-most character of the stripped encoded data string. The program then proceeds to step 124 to determine whether there are any more characters in the stripped recovery codeline to consider. If the determination in step 124 is negative, then a determination made that there is a match between the original codeline/encoded data string and the recovery codeline as shown in step 126. Otherwise, if the determination in step 124 is affirmative, then the program proceeds to step 128 to consider the next left-most character contained in the stripped recovery codeline. The program then loops back to step 120.

It should be apparent from the above-described example shown in FIGS. 4A, 4B, 5A, 5B, 6A, and 6B that there is a successful match between the original codeline/encoded data string the recovery codeline. The first five characters "1 through 5" of the stripped recovery codeline matches the first five characters of the stripped original codeline. The sixth character "0" of the stripped recovery codeline matches the first character of the stripped encoded data string. The seventh character "6" of the stripped recovery codeline matches the sixth character of the stripped original codeline. The eighth character "7" of the stripped recovery codeline matches the second character of the stripped encoded data string.

A number of advantages result by providing a method of operating the check processing system 10 in accordance with the present invention. One advantage is that an encoded data string may be used in the above-described codeline matching program 70 independent of how the encoded data string and the original codeline may be merged together. For example, the encoded data string may be located before the original codeline, after the original codeline, or even within the original codeline. This independence of the encoded data string relative to the original codeline eliminates sensitivity of the codeline matching program 70 to varying positions of characters contained in the recovery codeline relative to the original codeline. Accordingly, the codeline matching program 70 of the present invention does not need to be aware of either the field data structure of the recovery codeline or the field data structure of the original codeline.

Another advantage is that a relatively simple and efficient program is provided to assist the operator during exception recovery of the check processing system 10. Still another advantage is that the codeline matching program 70 does not use any parsing techniques to accomplish the codeline matching function during exception recovery. Since the codeline matching program 70 does not use any parsing techniques, the codeline matching program is capable of being used in a number of different transport application programs without requiring any programming changes to accommodate the different transport application programs.

It is contemplated that the above-described programs be available on portable storage media, such as a compact disc read only memory (CDROM)). The programs on a CDROM may be installed on different financial document processing systems to provide these systems with corresponding capabilities as described above. It is also contemplated that the exception recovery process described above may be used in other types of financial document processing systems, such as non-image-based systems, for example.

From the above description of the invention, those skilled in the art to which the present invention relates will perceive improvements, changes and modifications. Numerous substitutions and modifications can be undertaken without departing from the true spirit and scope of the invention. Such improvements, changes and modifications within the skill of the art to which the present invention relates are intended to be covered by the appended claims.

What is claimed is:

1. A method of operating a financial document processing system during exception recovery of a number of non-rejected financial documents, the method comprising the steps of:
   (a) obtaining an original codeline associated with a non-rejected financial document;
   (b) obtaining a recovery codeline associated with the non-rejected financial document;
   (c) stripping any blank spaces from the original codeline to provide a stripped original codeline;
   (d) stripping any blank spaces from the recovery codeline to provide a stripped recovery codeline; and
   (e) comparing a number of characters of the stripped recovery codeline and a number of characters of the stripped original codeline to determine if there is a match between the original codeline and the recovery codeline.

2. A method according to claim 1, further comprising the steps of:
   (f) obtaining an encoded data string associated with the non-rejected financial document;
   (g) stripping any blank spaces from the encoded data string to provide a stripped encoded data string; and
   (h) comparing a number of characters of the stripped recovery codeline with a number of characters of the stripped encoded data string when there is a mismatch of characters between the stripped recovery codeline and the stripped original codeline in step (e) to determine if there is a match between the original codeline/encoded data string and the recovery codeline.

3. A financial document processing system for processing a number of non-rejected financial documents, the financial document processing system comprising:
   means for (i) obtaining an original codeline associated with a non-rejected financial document, and (ii) obtaining a recovery codeline associated with the non-rejected financial document;
   means for (i) stripping any blank spaces from the original codeline to provide a stripped original codeline, and (ii) stripping any blank spaces from the recovery codeline to provide a stripped recovery codeline; and
   means for comparing a number of characters of the stripped recovery codeline and a number of characters of the stripped original codeline to determine if there is a match between the original codeline and the recovery codeline.

4. A financial document processing system according to claim 3, further comprising (i) means for obtaining an encoded data string associated with the non-rejected financial document, (ii) means for stripping any blank spaces from the encoded data string to provide a stripped encoded data string, and (iii) means for comparing a number of characters of the stripped recovery codeline with a number of characters of the stripped encoded data string when there is a mismatch of characters between the stripped recovery codeline and the stripped original codeline to determine if there is a match between the original codeline/encoded data string and the recovery codeline.

5. A program storage medium readable by a computer having a memory, the medium tangibly embodying one or more programs of instructions executable by the computer to perform method steps for operating a financial document processing system during exception recovery of a number of non-rejected financial documents, the method comprising the steps of:
   (a) obtaining an original codeline associated with a non-rejected financial document;
   (b) obtaining a recovery codeline associated with the non-rejected financial document;
   (c) stripping any blank spaces from the original codeline to provide a stripped original codeline;
   (d) stripping any blank spaces from the recovery codeline to provide a stripped recovery codeline; and
   (e) comparing a number of characters of the stripped recovery codeline and a number of characters of the stripped original codeline to determine if there is a match between the original codeline and the recovery codeline.

6. A program storage medium according to claim 5, wherein the method further comprises the steps of:
   (f) obtaining an encoded data string associated with the non-rejected financial document;
   (g) stripping any blank spaces from the encoded data string to provide a stripped encoded data string; and
   (h) comparing a number of characters of the stripped recovery codeline with a number of characters of the stripped encoded data string when there is a mismatch of characters between the stripped recovery codeline and the stripped original codeline in step (e) to determine if there is a match between the original codeline/encoded data string and the recovery codeline.

* * * * *